United States Patent
Reed, Jr.

[11] Patent Number: 5,984,068
[45] Date of Patent: *Nov. 16, 1999

[54] ELECTRO-MECHANICAL CLUTCH ACTUATOR

[75] Inventor: Richard G. Reed, Jr., Royal Oak, Mich.

[73] Assignee: Chrysler Corporation, Auburn Hills, Mich.

[*] Notice: This patent is subject to a terminal disclaimer.

[21] Appl. No.: 08/982,048

[22] Filed: Dec. 1, 1997

[51] Int. Cl.⁶ .................................................... F16D 19/00
[52] U.S. Cl. ...................... 192/84.6; 192/90; 192/111 A; 74/501.5 R
[58] Field of Search .............................. 192/84.6, 111 A, 192/90; 188/173; 74/501.5 R

[56] References Cited

U.S. PATENT DOCUMENTS

| | | | |
|---|---|---|---|
| 464,481 | 2/1891 | Tervo | 74/424.8 X |
| 4,006,801 | 2/1977 | Bayliss | 188/196 |
| 4,033,435 | 7/1977 | Bayliss | 188/173 |
| 4,651,852 | 3/1987 | Wickham et al. | 192/111 A |
| 4,793,206 | 12/1988 | Suzuki | 192/111 A X |
| 5,267,635 | 12/1993 | Peterson et al. | 192/90 X |

FOREIGN PATENT DOCUMENTS

| | | | |
|---|---|---|---|
| 2237350 | 5/1991 | United Kingdom | 192/111 A |
| WO 95/02857 | 1/1995 | WIPO . | |

OTHER PUBLICATIONS

Motion Systems Corporation, "Ball Drive 85010/85039/85206 Epicyclic Ball Screws".
Maurey Instrument Corp., "Conductive Plastic Slide Potentiometer", Type P2333 Slide Pot.

*Primary Examiner*—Charles A Marmor
*Assistant Examiner*—Ha Ho
*Attorney, Agent, or Firm*—Jennifer M. Stec

[57] ABSTRACT

In providing automated shifting of a manual transmission, the electro-mechanical clutch actuator of the present invention is provided for disengaging and engaging the clutch of a manual-type transmission. The electromechanical clutch actuator is provided with an assist spring/cam assembly which is designed to reduce the load on the electric motor. The assist spring/cam assembly allows the shift (including clutch release and engagement) to be made faster and with a reduced-size motor. The clutch actuator also includes a mechanical wear adjuster which automatically adjusts the position of the release linkage as a clutch disk wears over its useful life.

22 Claims, 4 Drawing Sheets

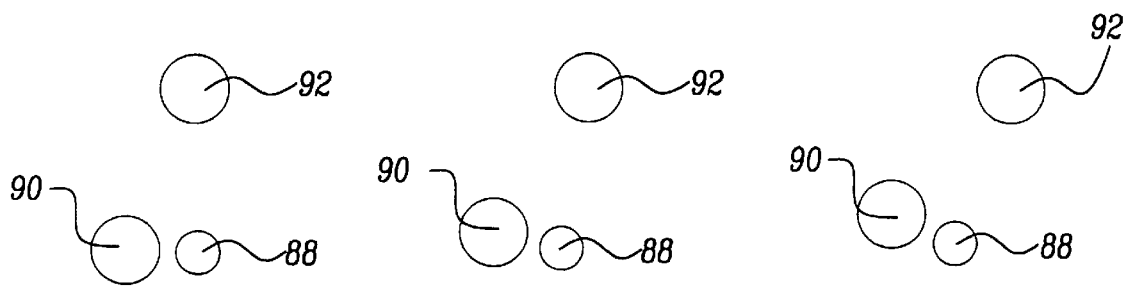
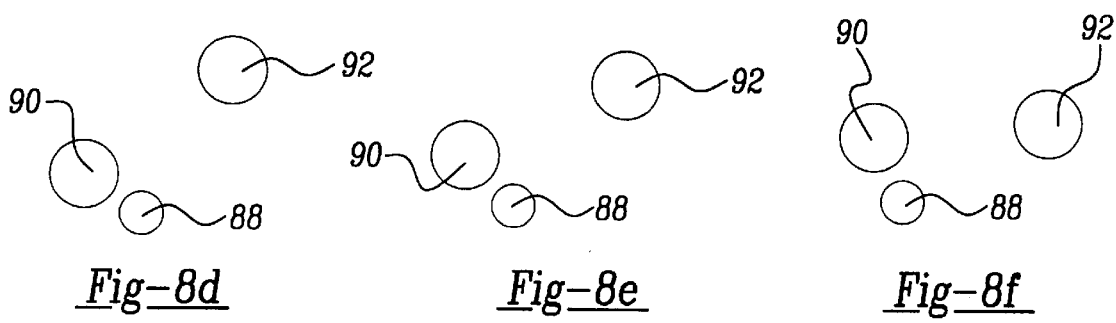
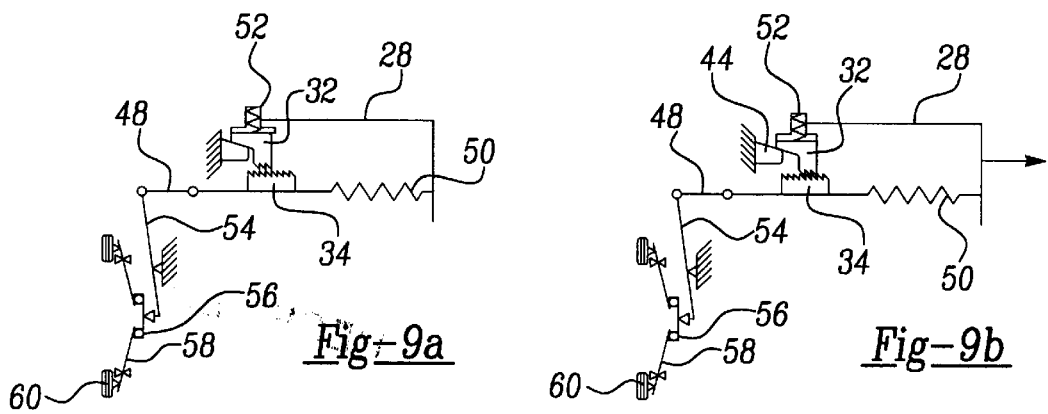
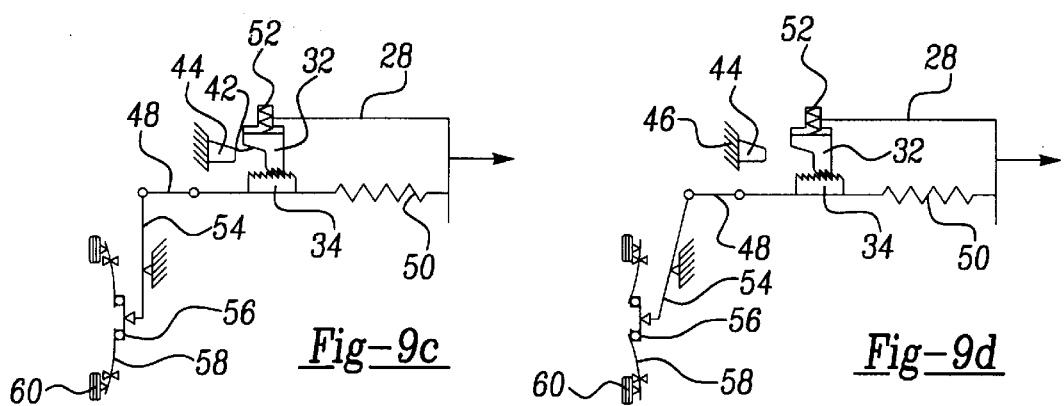

ELECTRO-MECHANICAL CLUTCH ACTUATOR

BACKGROUND OF THE INVENTION

Field of the Invention

The present invention relates to a clutch actuator device, and more particularly, to an electromechanical clutch actuator for automated shifting of a manual transmission.

BACKGROUND AND SUMMARY OF THE INVENTION

Both manual and automatic-shift transmissions are well known in the automotive industry. Manual transmissions typically include a shift lever which is manually operated by a vehicle operator to shift the manual transmission between the various gear ratios which are provided. In such a system, the shift lever is connected with a linkage system which is utilized to selectively engage a selected gear of an input shaft/counter-shaft manual transmission system. During the disengagement of one gear ratio and the subsequent engagement of another gear ratio, a clutch is typically disengaged in order to release the transmission input shaft from driving engagement with the engine output shaft. This clutch is typically disengaged by a clutch cable which is connected to a foot pedal which is depressed by the vehicle operator prior to shifting gears and subsequently released upon completion of a gear shift operation.

During the operation of a vehicle having a manual transmission, a vehicle operator can become accustomed to the rate at which the clutch pedal can be depressed and released for disengaging and reengaging the clutch for smooth operation of the vehicle during shifting operations.

As a clutch disk wears down over its useful life, the rate of disengagement and re-engagement of the clutch by the vehicle operator also changes in order to provide a smooth operation of the vehicle during shifting. Also, the clutch cable often needs to be manually adjusted as the clutch disk wears down in order to provide proper disengagement and reengagement.

Manual transmissions are widely considered to be more efficient than automatic transmissions since automatic transmissions have large parasitic losses associated with the pressurized hydraulic fluid systems which must be maintained for pressurizing the torque converter and hydraulically engaging and disengaging each of the clutch packs and brake assemblies which are typically associated with an automatic transmission. However, despite the relative inefficiency of an automatic transmission relative to a manual transmission, the simplicity and convenience of driving a vehicle having an automatic transmission is still preferred by a large portion of the automobile consumers.

Accordingly, the present invention is directed toward providing automated shifting of a manual transmission in order to provide a vehicle with a transmission which has the simplicity and convenience of an automatically shifted transmission but which does not have the parasitic losses associated with a standard automatic transmission, in particular, those associated with a torque converter and a hydraulic actuator system.

In providing automated shifting of a manual transmission, the electromechanical clutch actuator of the present invention is provided for disengaging and engaging the clutch of a manual-type transmission. The electromechanical clutch actuator is provided with an assist spring/cam assembly which is designed to reduce the load on the electric motor.

The assist spring/cam assembly allows the shift (including clutch release and engagement) to be made faster and with a reduced-size motor. The clutch actuator also includes a mechanical wear adjuster which automatically adjusts the position of the release linkage as a clutch disk wears over its useful life.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIGS. 8a–8f illustrate the relative position of the assist lever of the assist spring/cam assembly during various ranges of travel during actuation of the clutch actuator;

FIGS. 9a–9d schematically illustrate the operation of the wear compensator according to the principles of the present invention;

DETAILED DESCRIPTION OF THE PREFERRED EMBODIMENTS

Figure 1:
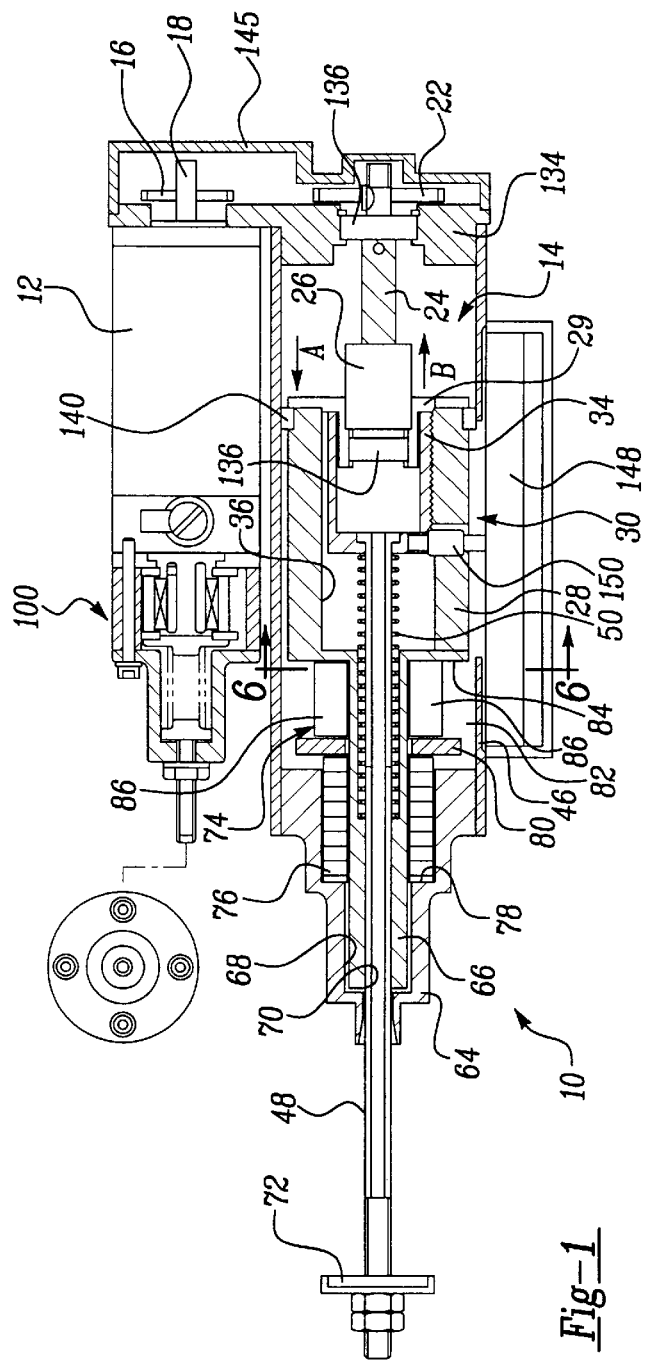
FIG. 1 is cross-sectional view of an electromechanical clutch actuator according to the principles of the present invention.

With reference to the accompanying drawings, the electromechanical clutch actuator 10 according to the present invention will be described. The clutch actuator 10 includes an electric motor 12 which provides a rotary drive member which is drivingly engaged with a ball screw assembly 14 via a drive gear 16 mounted on a drive shaft 18 of the electric motor 12. An idler gear 20 is driven by the drive gear 16. Idler gear 20 drives a driven gear 22 which is mounted to a ball screw shaft 24 of ball screw assembly 14. A ball screw nut 26 is disposed on the ball screw shaft 24.

Figure 2:
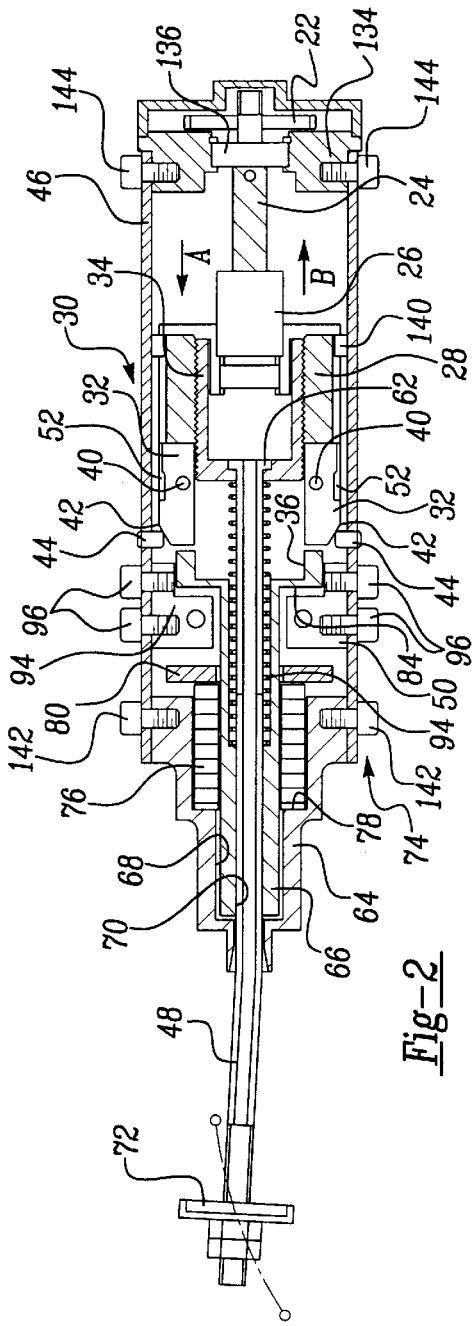
FIG. 2 is a cross-sectional view of the electromechanical clutch actuator according to the principles of the present invention.
Figure 3:
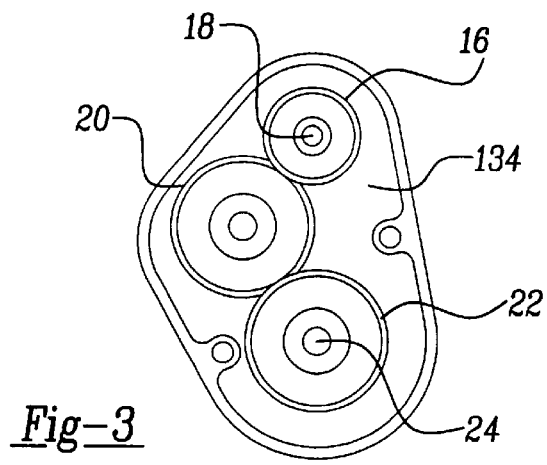
FIG. 3 is an end view of the electromechanical clutch actuator according to the present invention with the gear train housing removed.
Figure 4:
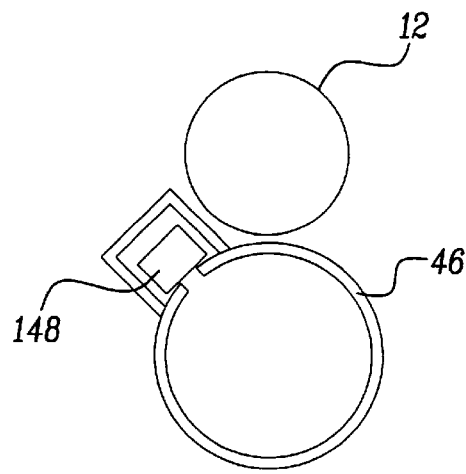
FIG. 4 is a schematic diagram illustrating the relative positioning of the actuator housing, the electric motor and the linear potentiometer.
Figure 5:
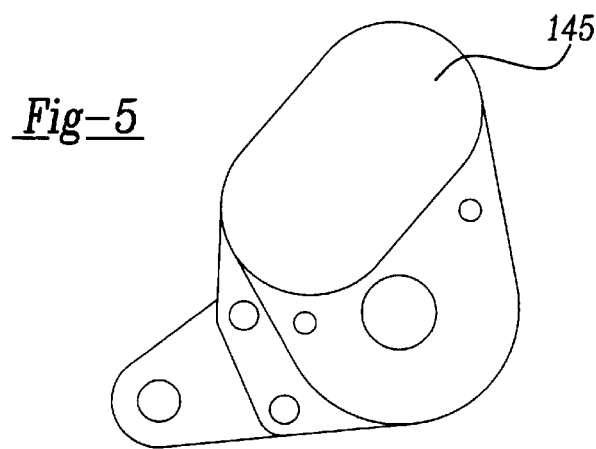
FIG. 5 is an end view of the gear train cover.

A self-adjuster housing 28 is attached to the ball screw nut 26 via an adapter plate 29. The self-adjuster housing 28 serves as a first member of a wear compensator assembly 30. The self-adjuster housing 28 supports a pair of pivot pawls 32 (as seen in FIG. 2) which serve as an engagement mechanism for engaging the self-adjuster housing 28 with a rack 34 having a toothed surface thereon. Rack 34 serves as a second member of the wear adjustment assembly 30. Rack 34 is formed as a generally cylindrical cup-shaped member which is received in a central opening portion 36 of self-adjuster housing 28. Pivot pawls 32 are pivotably mounted to the self-adjuster housing 28 by pivot pins 40. Pivot pawls 32 each include a ramp portion 42 which is engagable with a pair of adjustment retractor members 44 which extend radially inward from an actuator housing 46.

As the self-adjuster housing 28 is moved in the direction of arrow "A" toward the left-most position, as shown in FIGS. 1 and 2, thereby providing slack in the clutch cable 48, the ramp portion 42 of pivot pawls 32 engage the adjuster retractor members 44 causing pivot pawls 32 to pivot about pivot pins 40 and thereby disengage the rack 34. At this time, a preload spring 50 which is disposed between the self-adjuster housing 28 and rack 34 is allowed to extend generally to its relaxed position, thereby pressing the rack 34 relative to the self-adjuster housing 28 and thereby taking out any slack in the clutch cable 48. Accordingly, the wear compensator assembly 30 automatically adjusts the position of the release linkage in order to maintain the same clamp load as the clutch disk wears down over its useful life.

As the electric motor 12 is operated to drive the ball screw assembly 14 and thereby the self-adjuster housing 28 in the direction of arrow B, the ramp portion 42 of locking pawls 32 disengage from the adjustment retractor members 44 and are biased by leaf springs 52 back into engagement with rack 34.

The clutch cable 48 of the present invention is designed to be attached to a clutch disengagement linkage system. For example, FIGS. 9a–9d illustrate a typical clutch linkage system including a release lever 54 which is pivotably mounted to a transmission case. The release lever 54 is attached to a constant contact release bearing 56 which engages a diaphragm spring 58. The diaphragm spring 58 normally biases a clutch disk 60 into an engaged position.

In order to disengage the clutch disk 60, the electric motor 12 is driven and causes rotation of drive gear 16 which in turn drives the idler gear 20 and driven gear 22. Driven gear 22 causes rotation of the ball screw shaft 24 of ball screw assembly 14. Rotation of the ball screw shaft 24 causes axial movement of the ball screw nut 26 in the direction of arrow B. Movement of the ball screw nut 26 causes the self-adjuster housing 28 to move therewith. The self-adjuster housing 28, via engagement with the locking pawls 32, causes the rack 34 to move therewith along with the clutch cable 48. The clutch cable 48, which is attached to release lever 54, causes disengagement of the clutch disk 60.

As a clutch disk 60 wears down over its useful life, the position of the release linkage must be adjusted to maintain the same clamp load. Adjustment is also important because the assist spring force curve should preferably match the clutch disk during the entire wear cycle. Accordingly, the clutch actuator 10 of the present invention is provided with an automatic wear adjustment feature whereby the self-adjuster housing is driven in the direction of arrow A to a predetermined position whereby the ramp portion 42 of locking pawls 32 engage the adjustment retractor members 44 then cause the pivot pawls 32 to pivot about pivot pins 42 and disengage from rack 34. At this point, the pre-load spring 50 presses against the rack 34, so that rack 34 may be moved relative to the self-adjustor housing 28 in the instance that clutch disk wear is sufficient enough to require adjustment. In order to reengage the locking pawls 32 with the rack 34, the electric motor 12 is driven in order to drive the ball screw nut 26 in the direction of arrow B which causes the self-adjuster housing 28 to move therewith thereby causing the locking pawls 32 to disengage from the adjustment retractor members 44. At this time, the leaf springs 52 bias the locking pawls 32 back into engagement with the rack 34, and the actuator is automatically adjusted to compensate for wear of the clutch disk.

The clutch cable 48 is provided with an end fitting 62 which is received through an opening in rack 34. The clutch cable 48 extends through an end piece 64 of actuator housing 46. The self-adjuster housing 28 is provided with an axially extending guide portion 66 which is received within a central bore 68 in the end piece 64. The clutch cable 48 extends through a central opening 70 in the axially extending guide portion 66 of the self-adjuster housing 28. The clutch cable 48 is provided with an end fitting 72 which is connectable with the clutch release lever system described above.

An assist spring/cam assembly 74 is provided between the end piece 64 of the actuator housing 46 and the self-adjuster housing 28. The assist spring/cam assembly 74 includes an assist spring 76 in the form of a coil spring which is seated against a spring seat portion 78 of the end piece 64. A second end of the assist spring 76 is disposed against an assist washer 80 which is movably supported along the axially extending portion 66 of the self-adjuster housing 28. A pair of assist cams 82 are disposed between assist washer 80 and a radially extending wall portion 84 of self adjuster housing 28.

Figure 6:
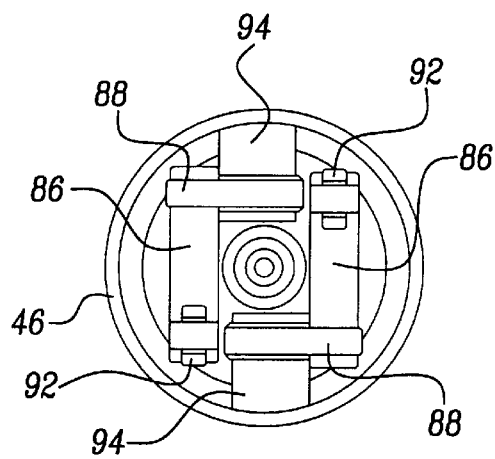
FIG. 6 is a cross-sectional view taken along line 6—6 of FIG. 1, illustrating the assist cam assembly according to the principles of the present invention.
Figure 7:
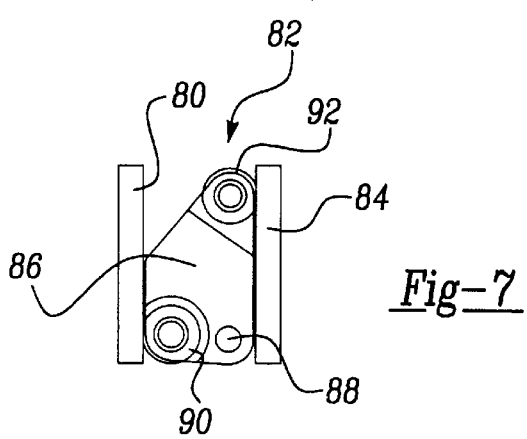
FIG. 7 is a side view of an assist lever of the assist spring/cam assembly according to the principles of the present invention.

With reference to FIGS. 6 and 7, assist cams 82 each include an assist lever 86 pivotably attached to the actuator housing 46 by a pivot pin 88 and including a first roller 90 disposed against the assist washer 80 and a second roller 92 disposed against the radially extending wall portion 84 of self-adjuster housing 28. The pivot pins 88 of the assist cam assembly 82 are supported by retainer members 94 which are attached to the actuator housing 46 via fasteners 96, as shown in FIGS. 2 and 6.

Figure 10:
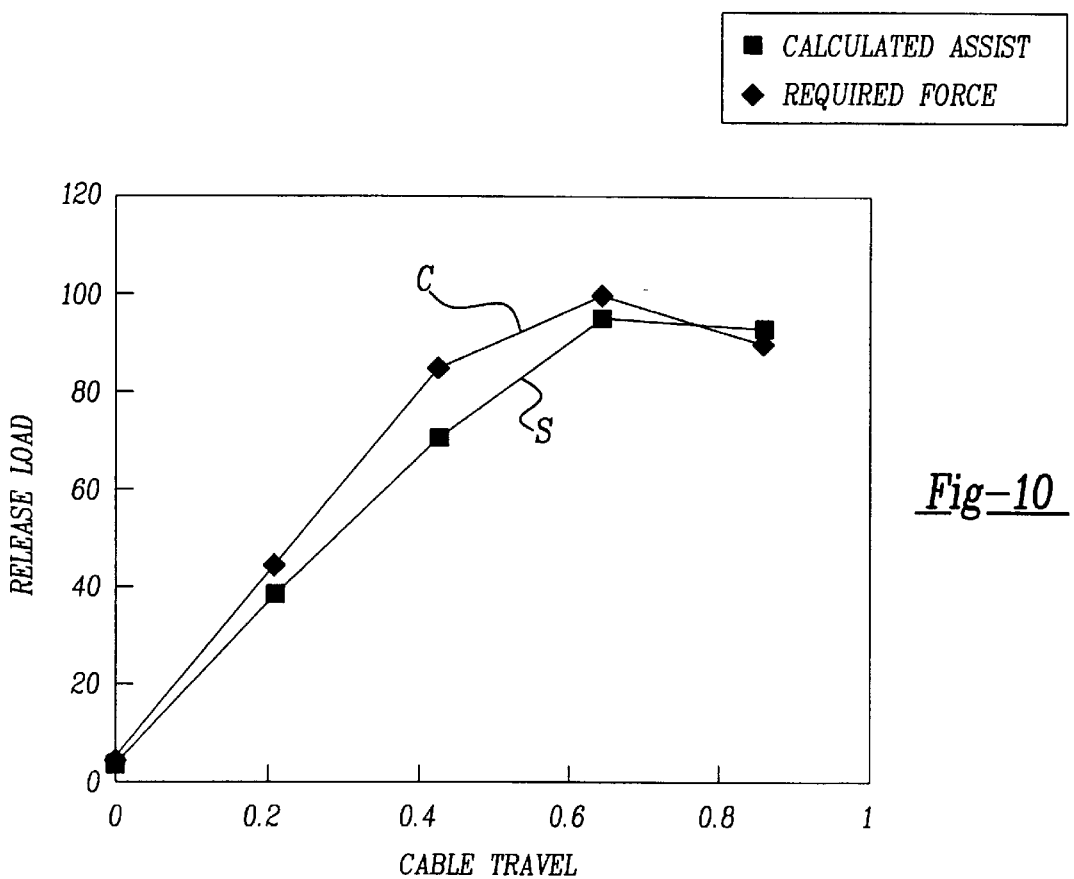
FIG. 10 is a graph illustrating the amount of release load force required for disengaging a clutch as well as the calculated amount of release load assistance provided by the assist spring/cam assembly during various intervals of cable travel.

As the clutch actuator 10 is operated for disengaging the clutch, the assist spring/cam assembly 74 helps to reduce the load on the electric motor. With reference to FIGS. 7 and 8a–8f, the operation of the assist spring assembly will now be described. During normal engagement of the clutch disk 60, the clutch actuator 10 is in a home position. In this state, the assist spring 76 presses against the assist washer 80 which presses against the assist levers 86 by acting on rollers 90. In this position, a very short moment arm "x" exists between the center of the pivot pin 88 and the center of the roller 90, while a maximum moment arm distance "y" is provided between the center of the pivot pin 88 and the center of roller 92. During actuation of the clutch actuator 10, movement of the self-adjustor housing 28 in the direction of arrow B allows the assist lever 86 to rotate about the pivot pin 88 causing an increase in the moment arm "x" and a corresponding decrease in the moment arm "y" during each increment of travel of the self-adjustor housing 28. FIGS. 8a–8f illustrate the changes in the moment arm dimensions at 20% travel intervals during rotation of the assist lever 86. FIG. 10 illustrates the amount of release load assist which is provided by the assist spring/cam assembly 74 in comparison with the amount of release load required for disengaging the clutch disk 60. As can be readily understood by one of ordinary skill in the art, as the length of the moment arms "x" and "y" between each of the rollers 90, 92, respectively, and the pivot pin 88 increase and decrease, respectively, during rotation of the assist levers 86, the amount of release load assist that can be generated by the assist spring/cam assembly 74 also increases. This allows the spring assist force curve "s" to closely match the clutch load curve "c".

Figure 11:
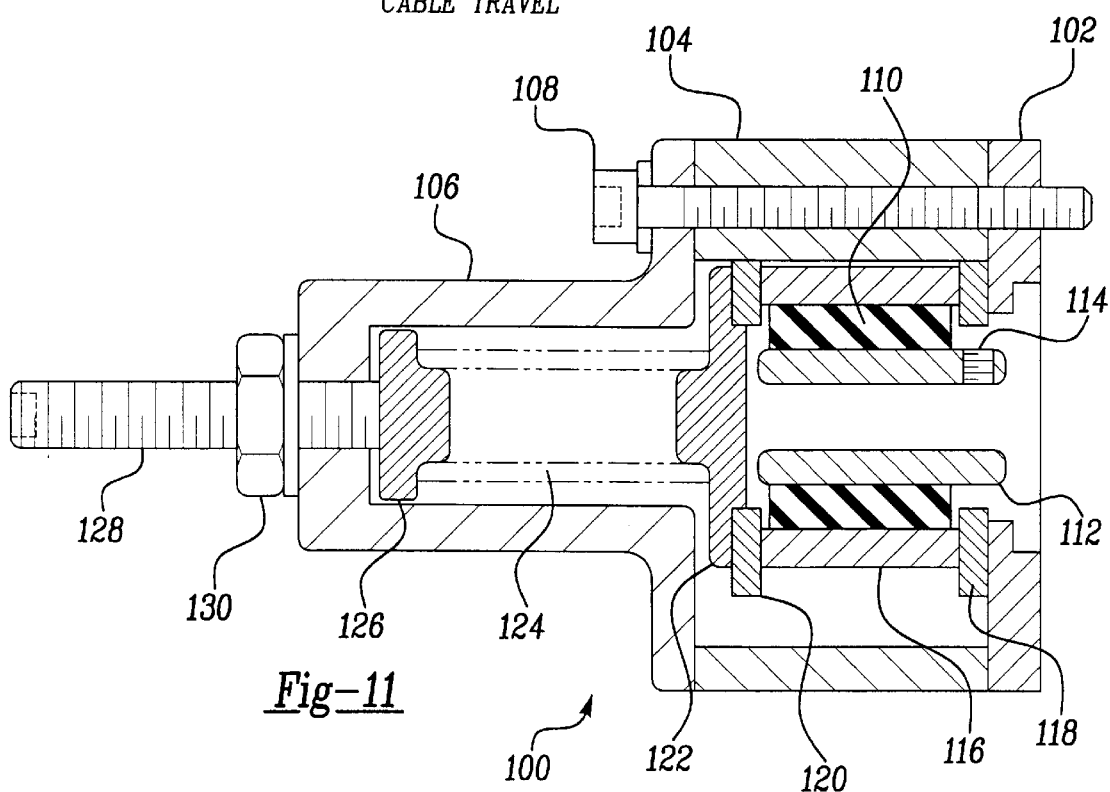
FIG. 11 is a detailed cross-sectional view of the one-way friction clutch utilized in the system of the present invention.

Due to the low friction on the actuator system and the possible mismatch of the assist spring load to the clutch load, there is a possibility for the clutch actuator unit to back drive when the actuator is stopped during mid-stroke. To eliminate this possibility, a one-way friction device 100 is attached to the motor drive shaft 18. With reference to FIG. 11, the one-way friction device 100 is shown. The one-way friction device 100 includes a housing base plate 102 which is attached to the electric motor 12. A friction brake housing 104 is mounted to the housing base plate 102 and a spring housing 106 is attached to the friction brake housing 104 via a set screw 108. A roller clutch 110 is disposed within the friction brake housing 104. Roller clutch 110 includes a roller clutch shaft 112 which is attached to the motor drive shaft 18 via a set screw which is inserted through the socket head 114. Anti-friction bushing 116 is disposed circumferentially around the roller clutch 110 and is sandwiched between first and second friction plates 118,120. Friction plate 118 is disposed between the friction bushing 116 and the housing base plate 102. Friction plate 120 is disposed between the friction bushing 116 and a spring bottom seat member 122. The spring bottom seat member 122 is biased by a compression spring 124 which is seated against the spring bottom seat member 122 and a spring top seat member 126. The spring top seat 126 is attached to a set screw 128 which is received through an opening in the spring housing 106. A jam nut 130 is provided on the set screw 128 to adjustably support the set screw 128 in an axial position relative to the spring housing 106. By adjustment of the jam nut 130, the spring top seat 126 can be moved in an axial direction to increase or decrease the amount of compression force on compression spring 124 and can thereby alter the friction resistance provided by the one-way friction device 100.

The electric motor 12 is attached to the actuator housing 46 by a motor mounting plate 134. An end portion of the ball screw shaft 24 is supported by the motor mounting plate 134 by a bearing assembly 136. A second end portion of the ball screw shaft 24 is supported via a bearing assembly 138 which is secured within adapter plate 29. The self-adjuster housing 28 is slidably supported within the actuator housing 46 by an actuator bearing 140. The end piece 64 is mounted to the actuator housing 46 by threaded fasteners 142, as shown in FIG. 2. The actuator housing 46 is also attached to the motor mounting plate 134 by fasteners 144. A gear train housing 145 is attached to the motor mounting plate 134 for covering the drive gear 16, the idler gear 20, and the driven gear 22.

A linear potentiometer 148 is provided to measure the travel of the actuator and give closed loop control of the actuator. The potentiometer 148 is mounted on the actuator housing 46 and measures the position of the clutch linkage. A linear potentiometer 148 as used in accordance with the present invention is available from Maurey Instrument Corp., Chicago, Ill. 60629. The linear potentiometer 148 measures the travel of the actuator and gives closed loop control. The potentiometer 148 is mounted on the actuator and measures the position of the clutch linkage. Since the potentiometer drive pawl 150 is connected downstream of the wear compensator 30, the wear of the clutch 60 can be measured. This will allow the control computer to adjust for changing modes as the clutch 60 wears and will also allow for the computer to determine when the clutch 60 is worn out.

The ball screw assembly 14 has an overrunning feature at each end of its stroke. The overrunning feature allows the ball screw assembly 14 to be operated to drive the ball screw nut 26 to the end of its stroke in order to zero-in the potentiometer travel. The motor is run against its stop for a short duration to ensure that the wear adjustment is complete and then the potentiometer reading is taken. This is used for the starting point for the release travel. The ball screw assembly having an overrunning feature is available from Motion Systems Corporation, Eaton Town, N.J. 07724. With conventional ball screw assemblies which do not have the overrunning feature, the ability to drive the ball screw nut 26 to the end of the shaft 24 is limited due to the fact that if the ball screw nut 26 is driven too tightly against the end, a lock-up may occur. Therefore, with the overrunning feature, any lock-up associated with a standard ball screw assembly can be avoided, and a zeroing-in of the potentiometer travel can be properly achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An actuator device, comprising:
a rotary drive member;
a ball screw assembly drivingly engaged with said rotary drive member, said ball screw assembly including a ball screw shaft and a ball screw nut disposed on said ball screw shaft;
an adjustment assembly including a first member connected to said ball screw nut for reciprocal movement therewith and a second member adjustably engaged with said first member by an engagement mechanism, said engagement mechanism being released from engagement when said first member is moved to a predetermined position, said engagement mechanism being reengaged when said first member is moved away from said predetermined position such that said second member is movable with said first member, wherein said engagement mechanism includes a locking pawl supported on one of said first and second members, said locking pawl being engagable with a toothed rack disposed on the other of said first and second member.

2. The actuator according to claim 1, wherein said locking pawl includes a ramp portion which engages an adjustment retractor when said first member is moved to said predetermined position for disengaging said locking pawl from said toothed rack.

3. The actuator according to claim 2, further comprising a spring disposed between said first member and said second member.

4. The actuator according to claim 1, wherein said locking pawl is pivotally mounted to said first member.

5. The actuator according to claim 1, wherein said ball screw nut is capable of freewheeling at least one end of said ball screw shaft.

6. The actuator according to claim 1, wherein said rotary drive member includes an electric motor.

7. The actuator according to claim 1, further comprising a clutch device attached to said rotary drive member.

8. The actuator according to claim 1, wherein said clutch device is a one-way friction clutch device.

9. The actuator according to claim 1, wherein said locking pawl is biased to an engaged position.

10. The actuator according to claim 1, further comprising sensor means for detecting a position of said first member.

11. An actuator device, comprising:

a rotary drive member;

a ball screw assembly drivingly engaged with said rotary drive member, said ball screw assembly including a ball screw shaft and a ball screw nut disposed on said ball screw shaft;

an first member connected to said ball screw nut for reciprocal movement therewith; and an assist spring for biasing said first member in a predetermined direction relative to the ball screw shaft; and an assist cam assembly disposed between said assist spring and one of said first member and an actuator housing.

12. The actuator according to claim 11, wherein said assist cam assembly includes an assist lever pivotally mounted to said actuator housing, said assist lever including a first cam roller disposed against said first member and a second cam roller disposed against an assist washer which is disposed next to said assist spring.

13. The actuator according to claim 11, further comprising sensor means for detecting a position of said first member.

14. The actuator according to claim 11, wherein said ball screw nut is capable of freewheeling at least one end of said ball screw shaft.

15. The actuator according to claim 11, wherein said rotary drive member includes an electric motor.

16. The actuator according to claim 11, further comprising a one-way friction clutch device attached to said rotary drive member.

17. An clutch actuator device, comprising:

a rotary drive member;

a ball screw assembly drivingly engaged with said rotary drive member, said ball screw assembly including a ball screw shaft and a ball screw nut disposed on said ball screw shaft;

an adjustment assembly including a first member connected to said ball screw nut for reciprocal movement therewith and a second member adjustably engaged with said first member by an engagement mechanism, said engagement mechanism being released from engagement when said first member is moved to a predetermined position, said engagement mechanism being reengaged when said first member is moved away from said predetermined position such that said second member is movable with said first member; and an assist spring for biasing said first member in a predetermined direction, wherein said engagement mechanism includes a locking pawl supported on one of said first and second members, said locking pawl being engagable with a toothed rack disposed on the other of said first and second member.

18. The clutch actuator according to claim 17, further comprising a spring disposed between said first member and said second member.

19. The clutch actuator according to claim 17, further comprising a clutch device attached to said rotary drive member.

20. The clutch actuator according to claim 17, further comprising sensor means for detecting a position of said first member.

21. An clutch actuator device, comprising:

a rotary drive member:

a ball screw assembly drivingly engaged with said rotary drive member, said ball screw assembly including a ball screw shaft and a ball screw nut disposed on said ball screw shaft;

an adjustment assembly including a first member connected to said ball screw nut for reciprocal movement therewith and a second member adjustably engaged with said first member by an engagement mechanism, said engagement mechanism being released from engagement when said first member is moved to a predetermined position, said engagement mechanism being reengaged when said first member is moved away from said predetermined position such that said second member is movable with said first member; and an assist spring for biasing said first member in a predetermined direction; and assist cam assembly disposed between said assist spring and one of said first member and an actuator housing.

22. The clutch actuator according to claim 21, wherein said assist cam assembly includes an assist lever pivotally mounted to said actuator housing, said assist lever including a first cam roller disposed against said first member and a second cam roller disposed against an assist washer which is disposed next to said assist spring.

* * * * *